United States Patent [19]

Morita

[11] Patent Number: 4,694,800
[45] Date of Patent: Sep. 22, 1987

[54] SYSTEM AND METHOD FOR CONTROLLING IGNITION TIMING FOR AN INTERNAL COMBUSTION ENGINE

[75] Inventor: Tatsuo Morita, Yokosuka, Japan

[73] Assignee: Nissan Motor Company, Limited, Kanagawa, Japan

[21] Appl. No.: 921,490

[22] Filed: Oct. 22, 1986

[30] Foreign Application Priority Data

Oct. 22, 1985 [JP] Japan .................................. 60-235815

[51] Int. Cl.[4] .............................................. F02P 5/04
[52] U.S. Cl. .................................................. 123/425
[58] Field of Search ................................ 123/425, 435

[56]      References Cited
       U.S. PATENT DOCUMENTS

| 4,517,944 | 5/1985 | Inoue et al. | 123/425 |
| 4,517,945 | 5/1985 | Ishigami et al. | 123/425 |
| 4,517,952 | 5/1985 | Hosoya | 123/638 |
| 4,582,032 | 4/1986 | Hara et al. | 123/339 |
| 4,586,474 | 5/1986 | Akasu | 123/425 |
| 4,590,565 | 5/1986 | Takasu et al. | 123/425 |
| 4,625,691 | 12/1986 | Komurasaki et al. | 123/425 |
| 4,640,249 | 3/1987 | Kawamura et al. | 123/425 |
| 4,658,787 | 4/1987 | Takizawa | 123/418 |
| 4,658,789 | 4/1987 | Morita | 123/422 |
| 4,660,535 | 4/1987 | Asano | 123/425 |

FOREIGN PATENT DOCUMENTS 26170  2/1985  Japan .

Primary Examiner—Willis R. Wolfe, Jr.
Attorney, Agent, or Firm—Schwartz, Jeffery, Schwaab, Mack, Blumenthal & Evans

[57]  ABSTRACT

An ignition timing control system and method for a vehiclular internal combustion engine which effectively avoids an occurrence of engine knocking and improves engine performance. In the ignition timing control system and method, the engine knocking is predicted which will occur when an engine operating state becomes a high load due to an abrupt change in an engine revolutional speed. While the engine knocking is predicted, a correction amount (K.Y, K.X) for a retardation angle correction amount ($SA_{ri}$) is increased with the correction coefficient set to a large multiple so that a correction for the ignition timing is carried out at a more earlier stage to avoid the occurrence of knocking.

11 Claims, 14 Drawing Figures

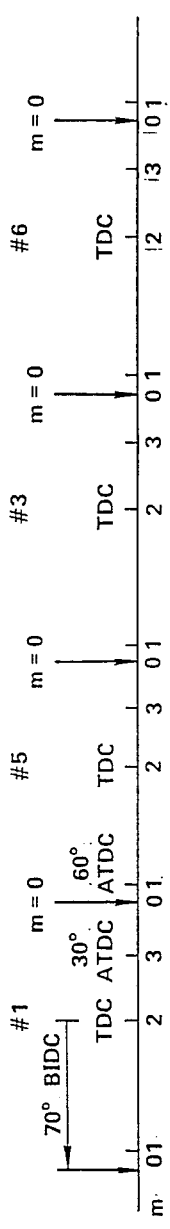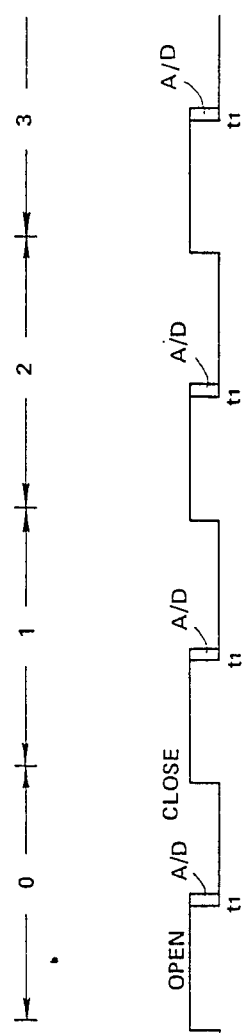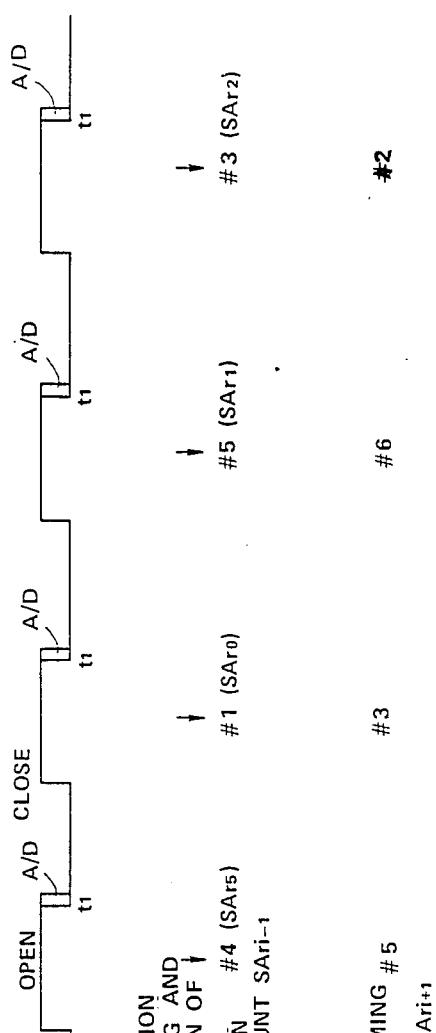

SYSTEM AND METHOD FOR CONTROLLING IGNITION TIMING FOR AN INTERNAL COMBUSTION ENGINE

BACKGROUND OF THE INVENTION

1. Field of the Invention

The present invention relates to a system and method for controlling ignition timing for an internal combustion engine and particularly relates to the system and method for controlling the ignition timing applicable to vehicular engines which effectively avoid occurrence of engine knocking during a high engine load and thus improve engine performance.

2. Description of the Prior Art

Ignition timing for an internal combustion engine must be determined in relation to engine operating conditions so that the engine is operated optimally.

In general, taking efficiency and fuel economy of the engine into account, it is most preferable to ignite each of the engine cylinders at a timing in the vicinity of a minimum advance angle in order to generate maximum engine torque, i.e., to provide so called MBT (Minimum advance for Best Torque). Therefore, it is necessary to change the ignition timing to the MBT state according to the engine operating conditions.

However, since engine knocking tends to occur under certain engine operating conditions when the ignition timing is advanced, a stable engine operation cannot be achieved. For example, engine knocking tends to occur under transient engine operating conditions.

One ignition timing control system for vehicular engines which prevents engine knocking during engine transient operating states is disclosed in Japanese Patent Application Unexamined Open No. Sho 60-26170 published on Feb. 9, 1985.

In the above-identified Japanese Patent Application document, the control system continually checks to see whether the engine is accelerating and when the engine is accelerating, it reads out one of a plurality of retardation angle correction amounts preallocated according to the instantaneous throttle valve opening angle and according to the rate of change of the throttle valve opening angle. A basic ignition timing value determined according to engine operating conditions is corrected on the basis of the preallocated retardation angle correction amount. In this way, the engine knocking can be avoided by using the resulting ignition timing angle as the actual ignition timing.

In this conventional ignition timing control system, the basic ignition timing is corrected on the basis of a preallocated retardation angle correction amount during engine acceleration. Therefore, in a case, e.g., when an acceleration change (a gear change with a throttle valve opening angle not changed) is carried out in an automatic transmission (AT) system of the vehicle, the engine becomes a high load state due to air introduction through an inertial force thereof toward an intake air passage of the engine and an abrupt change of an engine speed. However, an immediate correction of the ignition timing toward the retardation angle side cannot be carried out to cope with such an abrupt transfer to a high engine load state so that the engine knocking will result.

SUMMARY OF THE INVENTION

With the above-described problem in mind, it is an object of the present invention to provide a system and method for controlling ignition timing for a vehicular internal combustion engine which avoids the occurrence of engine knocking when the engine operating state becomes a high load due to the abrupt change in the engine speed.

The above-described object can be achieved by a system for controlling ignition timing for a vehicular internal combustion engine, comprising: (a) first means for detecting an engine operating condition; (b) second means for calculating a change rate of an engine revolution speed on the basis of the engine operating condition detected by the first means; (c) third means for determining whether the engine operating condition is transferred to an engine load region such that an occurrence of engine knocking can be predicted on the basis of the change rate of the engine revolution speed calculated by the second means; (d) fourth means for deriving a basic ignition timing angle on the basis of the engine operating condition detected by the first means; (e) fifth means for setting a first correction coefficient on the basis of which the basic ignition timing angle derived by the fourth means is corrected when the third means determines that the engine operating condition is transferred to the engine load region; (f) sixth means for detecting whether a knocking is generated in the engine; (g) seventh means for calculating an ignition timing angle correction amount for correcting the basic ignition timing angle drived by the fourth means on the basis of the first correction coefficient set by the fifth means when the sixth means detects the engine knocking so that the ignition timing is immediately corrected toward a retardation angle side; (h) eighth means for correcting the basic ignition timing angle derived by the fourth means according to the ignition timing angle correction amount calculated by the seventh means; and (i) ninth means for igniting air-fuel mixture supplied to each engine cylinder at an ignition timing angle corrected by the eighth means.

BRIEF DESCRIPTION OF THE DRAWINGS

FIGS. 8(A) through 8(E) are operational timing charts for explaining the operation of the control circuit;

DETAILED DESCRIPTION OF THE PREFERRED EMBODIMENT

Reference will hereinafter be made to the drawings in order to facilitate understanding of the present invention.

Figure 1:
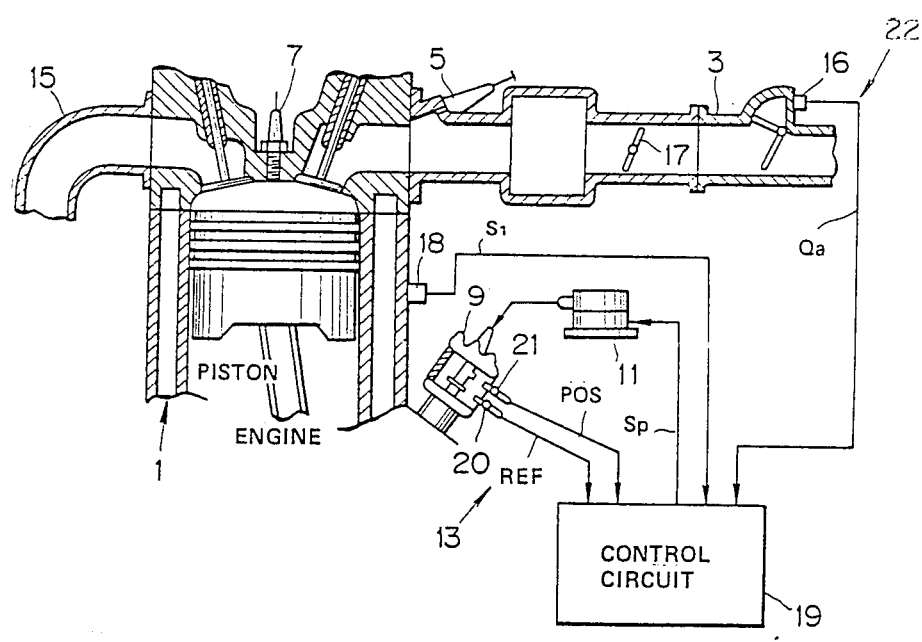
FIG. 1 is a schematic block diagram of a system for controlling ignition timing in a preferred embodiment according to the present invention.

FIG. 1 shows the configuration of an ignition timing control system according to the present invention applied to an internal combustion engine.

As shown in FIG. 1, intake air is introduced through an air cleaner (not shown) and supplied to each engine cylinder of an engine 1 via an intake air pipe 3. On the other hand, fuel is injected through an injector 5 under the control of an injection signal inputted to the injector 5. Each engine cylinder is provided with an ignition plug 7. Each ignition plug 7 receives high-voltage surges from an ignitor 11 via a distributor 9. The ignition plugs 7, distributor 9, and ignitor 11 constitute ignition means. The ignition means generates and discharges the high-voltage surges under the control of the incoming ignition signal Sp. The air-fuel mixture within the engine cylinder is ignited and burned by the discharge of the high-voltage surge across a spark gap of the corresponding ignition plug 7 and thereafter the resulting exhaust gas is exhausted through an exhaust pipe 15. The intake air quantity Qa is measured by means of an air flow sensor 16 and is controlled by means of a throttle valve 17 within the intake air pipe 3. A knocking sensor 18 is mounted on each cylinder or on the engine body 1 for detecting combustion pressure within each or just one representative cylinder. The knocking sensor 18 comprises a vibration pressure responsive element, such as a piezoelectric element, or a magnetostrictor. The output signal $S_1$ of the knocking sensor 18 is sent to a control circuit (control unit) 19. The control unit 19 determines whether the engine is knocking on the basis of the output signal $S_1$ of the knocking sensor 18. A pair of crank angle sensors 20, 21 are installed within the distributor 9, respectively. One crank angle sensor 20 determines a cylinder number which is the basis of an ignition order and the other crank angle sensor 21 detects the angular position, or crank angle, of an engine crankshaft via the distributor 9. The first crank angle sensor 20 produces a pulse (hereinafter, referred to as REF signal) each time the distributor shaft (linked indirectly with the engine crankshaft) rotates through 60 degrees, i.e., whenever the engine crankshaft rotates through 120°. The pulse rises, e.g., at an angular position of a piston 70° before the top dead center (TDC) of the compression stroke. The pulsewidth of this pulse (the crank angle between its rising time to its falling time) is different for a different cylinder. The other crank angle sensor 21 produces 360 pulses as the distributor shaft rotates through one revolution, and thus produces a rising or falling pulse for each one degree of crank angle CA (hereinafter referred to as POS signal). The REF and POS signals are exemplified by a U.S. patent application Ser. No. 861,006, filed on May 8, 1986. The contents of this U.S. patent application is hereby incorporated by reference. The air flow sensor 16 and crank angle sensors 20, 21 constitute engine operating condition detecting means. The REF signal, POS signal, and Qa signal are inputted to the control unit 19 which executes the ignition timing control procedure on the basis of these sensor data. (Although the control unit also performs injection quantity control, description thereof is omitted.)

Figure 2:
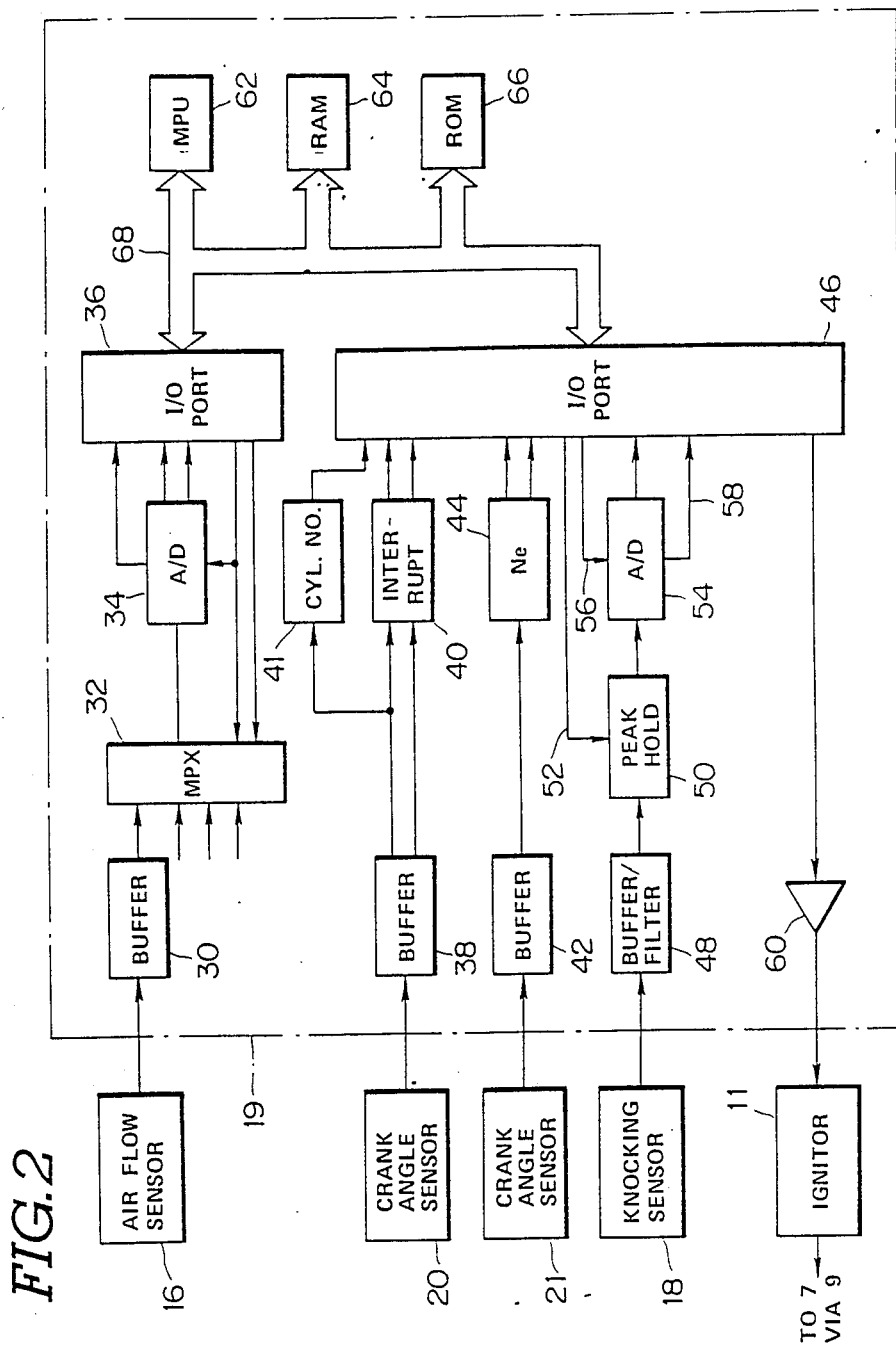
FIG. 2 is a schematic internal circuit block diagram of a control circuit shown in FIG. 1.

FIG. 2 is a circuit block diagram of the internal construction of the control unit 19. An intake air quantity signal Qa derived from the air flow sensor 16 is sent to an analog multiplexor 32 via a buffer 30. After the intake air quantity signal Qa is selected according to a command from a microprocessing unit (MPU) 62 and is converted into a digital signal by means of an A/D converter 34, the digital quantity signal is sent to a microcomputer via an Input/Output Port 36. The microcomputer is made up of Input/Output Ports (I/O Ports) 36, 46, common data bus 68, MPU 62, RAM (Random Access Memory) 64, and ROM (Read Only Memory) 66.

The REF signal derived from the crank angle sensor 20 is inputted to an interrupt request signal generation circuit 40 and cylinder number determination circuit 41 via a buffer 38. In addition, the POS signal derived from the other crank angle sensor 21 is inputted to the interrupt request signal generation circuit 40 and engine revolution speed signal generation circuit 44. The cylinder number determination circuit 41 determines the current cylinder to be ignited from the pulsewidth of the REF signal, forms a binary code identifying the determined cylinder number, and sends the binary code to the microcomputer. The interrupt signal generation circuit 40 forms the interrupt request signal for each predetermined crank angle CA from the REF signal and POS signal and sends the interrupt request signal via the I/O port 46 to the microcomputer. The engine revolutional speed signal generation circuit 44 generates the binary code signal representing the engine revolution speed Ne from a period of the POS signal. The binary code signal is then sent to the microcomputer via the I/O port 46. The output signal $S_1$ derived from the knocking sensor 18 is inputted to a peak hold circuit 50 via a circuit 48 comprising a buffer for impedance conversion and a band-pass filter for enabling a passage of signal components in a frequency band inherent to engine knocking (7 through 8 kHz). The peak hold circuit 50 holds the maximum amplitude value (peak value a) of the output signal $S_1$ from the knocking sensor 18 when a knock gate is open in response to a "1" level signal from the MPU 62. The output signal of the peak hold circuit 50 is converted into a corresponding binary signal by means of the A/D converter 54 and is sent to the microcomputer via the I/O Port 46. The analog-to-digital conversion by means of the A/D converter 54 is started in response to an analog-to-digital conversion activation signal derived from the MPU 62 via the I/O Port 49 and line 56. When the A/D conversion is ended, the A/D converter 56 sends a signal indicating that the analog-to-digital conversion has been completed to the microcomputer via a line 58 and I/O Port 46. Hence, the knocking sensor 18, buffer/filter circuit 48, peak-hold circuit 50, and A/D converter 58 constitute knocking detection means.

On the other hand, when the ignition signal Sp is outputted to a drive circuit 60 via the Input/Output Port 46, the ignitor 11 is energized in response to the ignition signal Sp serving as a drive signal so that the ignition control is carried out under the control of the ignition signal Sp.

A basic ignition timing value $SA_o$ is stored in the ROM 66 in a predetermined three-dimensional table according to the engine speed Ne and intake air quantity per engine revolution (pressure in the intake air duct in cases where the pressure-responsive sensor detects pressure downstream of the throttle valve 17 in place of the air flow sensor 16). In this way, the control unit 19 comprises a microcomputer, buffers 30, 38, and 42, buffer/filter 48, peak hold circuit 50, A/D converters 34, 54, cylinder number determination circuit 41, interrupt request signal generation circuit 40, engine speed signal generation circuit 44, analog multiplexor 32, and drive circuit 60. The microcomputer comprises the I/O ports 36, 46, MPU 62, Random Access Memory (RAM) 64, Read Only Memory (ROM) 66, a clock generator (not shown), and a common bus.

An operation of the preferred embodiment will be described below.

First, processing routines in the preferred embodiment according to the present invention will be described. It should be noted that although numerical values used below are most convenient for explaining the action of the preferred embodiment, the present invention is not limited to these numerical values and the numerical values are selected as optimum values for individual engines.

Figure 3:
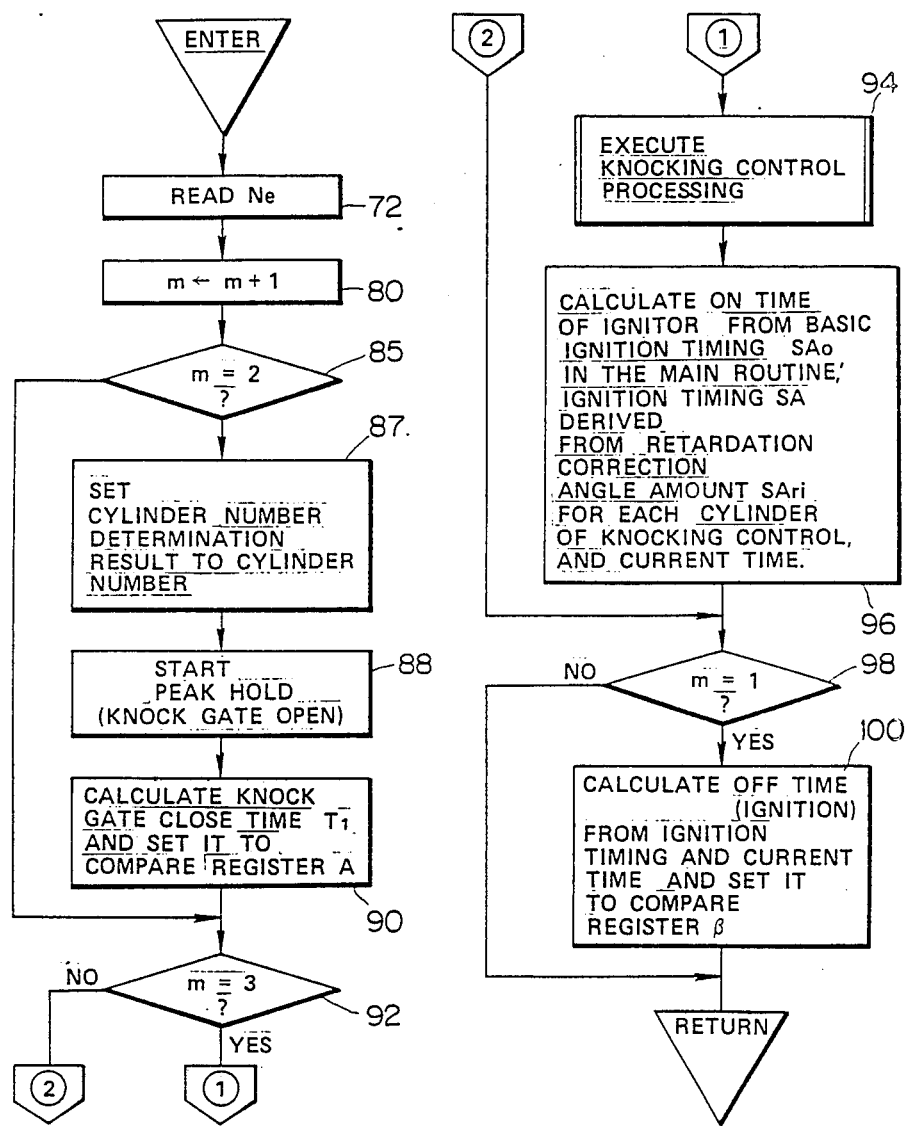
FIGS. 3 through 7 are operation flowcharts representing processing routines executed in the control circuit shown in FIGS. 1 and 2.
Figure 4:
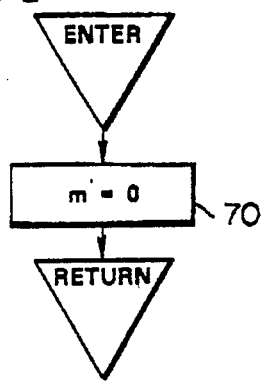

When the interrupt request signal for each predetermined crank angle CA, i.e., the interrupt request signal at the rising edge of the REF signal (hereinafter, referred to as REF interrupt) and at ATDC 30° and ATDC 60° (After Top Dead Center in the explosion stroke of each cylinder) are sent from the interrupt request signal generation circuit 40 into the MPU 62, the MPU 62 executes interrupt processing routines shown in FIGS. 3 and 4. A main routine shown in FIG. 3 mainly samples the peak value of the signal $S_1$ from the knocking sensor 18 and determines the presence or absence of knocking therefrom. The subroutine shown in FIG. 4 resets the count value m of a crank angle counter. When the REF interrupt request signal is received, the routine shown in FIG. 4 is executed. In a step 70, the count value m is reset and control is returned to the main routine. Since the rise of the REF signal appears at the crank angle CA 70° before the top dead center (70° BTDC), the count value m is reset at the crank angle CA 70° before the top dead center of each cylinder. When the angle interrupt request signal is received, the main routine shown in FIG. 3 is executed. The engine speed value Ne derived from the engine speed signal generation circuit 44 is fetched in a step 72. Next, in a step 80, the count value m of the crank angle counter is incremented by +1.

FIG. 8(A) shows the relationship between the above-described count value m and the crank angle CA.

Next, in a step 86, the MPU 62 determines whether or not the count value m is two, i.e., whether the piston has reached the top dead center (TDC) of the compression stroke of the current cylinder. The routine goes to a step 92 if the piston has not yet reached the TDC. Otherwise, the routine goes to a step 87 once the piston reaches the TDC of the current cylinder.

Next, in a step 88, a knock gate in the peak hold circuit 50 is open to start holding the peak value. In a step 90, the knock gate is closed and a time $t_1$ at which the holding of the peak value is stopped is calculated and stored in a compare register A.

Figure 5:
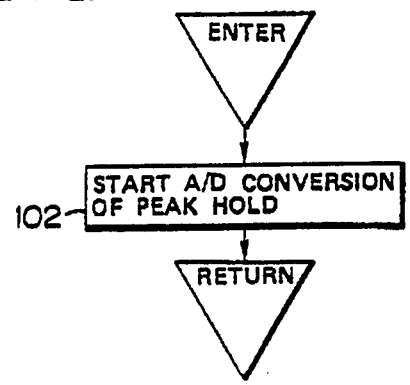
Figure 6:
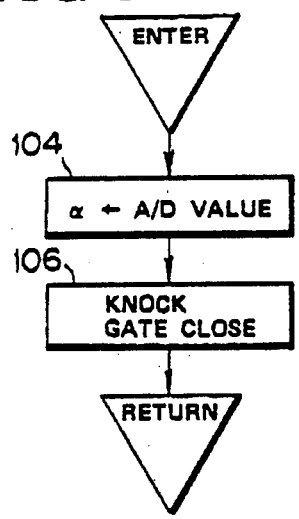

At the time $t_1$, a time conicidence interrupt routine shown in FIG. 5 is executed. In a step 102, the analog-to-digital conversion of the peak hold value is started. When the analog-to-digital conversion is ended, the analog-to-digital converter 54 issues an end report signifying completion of analog-to-digital (A/D) conversion to the MPU 62. Upon receipt of the end report, an A/D conversion end interrupt routine shown in FIG. 6 is executed. In this routine, the A/D converted value is stored in a predetermined area in the RAM 64 as a peak value a in a step 104. In a step 106, the knock gate is closed and control is returned to the main routine.

FIGS. 8(B) and 8(C) show the timings at which the knock gate is opened and closed in the above-described interrupt routine.

Next, the MPU 62 determines whether or not the count value m is three, that is to say, if the piston has reached 30 degrees after the top dead center in the explosion stroke. If the piston has not yet reached 30° ATDC, the routine goes to a step 98. On the other hand, once the piston reaches 30° ATDC, the MPU 62 checks to determine whether the engine is knocking in a step 94. If so, a knocking control processing is executed in which a retardation angle correction amount is calculated. The knocking control processing is executed in an interrupt processing routine for each 30° ATDC in FIG. 9 (refer to FIG. 8(D)).

Next, in a step 96, a basic ignition timing value $SA_o$ is calculated by interpolation of a map representing the basic ignition timing stored in the ROM 66 in the main routine (not shown). (This map is exemplified by a copending U.S. patent application Ser. No. 749,441 filed on June 27, 1986, now U.S. Pat. No. 4,660,535. This U.S. patent application document is hereby incorporated by reference.) Then, the basic timing value and a correction retardation angle amount $SA_{ri+1}$ (i denotes a cylinder number and i+1 denotes the next cylinder to be ignited. Hence, when i+1=6, it is assumed to be zero.) allocated to each cylinder for controlling the engine knocking are used to calculate the desired, actual ignition timing SA ($SA = SA_o - SA_{ri+1}$). Then, the on-time of the ignitor 11 is calculated from the ignition timing SA and current time and is set in the compare register B (refer to FIG. 8(E)). In the subsequent step 98, the MPU 62 determines whether the count value m is 1 or not, i.e., whether the piston has reached 60 degrees after the top dead center (60° ATDC) in the explosion stroke for each cylinder. If the piston has not yet reached 60° ATDC, control is returned to the main routine. Once the piston reaches 60° ATDC, the off-time at which the ignitor 11 is turned off is calculated from the ignition timing SA and current time and is set in the compare register B, and control is returned to the main routine. The on-time and off-time of the ignitor 11 is also exemplified by the U.S. patent application Ser. No. 861,006, filed on May 8, 1986. This U.S. patent application is hereby incorporated by reference.

Figure 7:
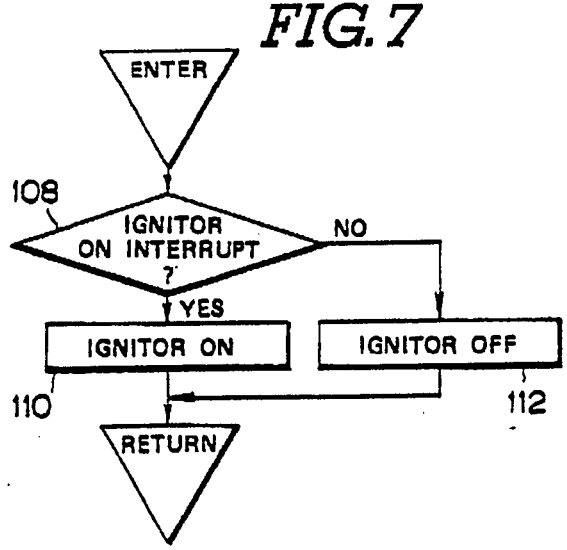

Upon the arrival of each time set in the steps 96 and 100, the time coincidence interrupt processing routine shown in FIG. 7 is executed. The MPU 62 determines in a step 108 whether it is an interrupt of an ignitor on set in the step 96. When it is the interrupt of ignitor on, the ignitor 11 is turned on in a step 110. On the other hand, when it is the interrupt of ignitor off set in the step 100, the ignitor 11 is turned off and the routine returns to the main routine. Consequently, the ignition of air-fuel mixture supplied to the corresponding cylinder is carried out at the ignition timing SA to be executed.

Next, the contents of the knocking control processing in the step 94 of FIG. 3 will be described in details with reference to a flowchart representing a subroutine shown in FIG. 9.

Figure 9:
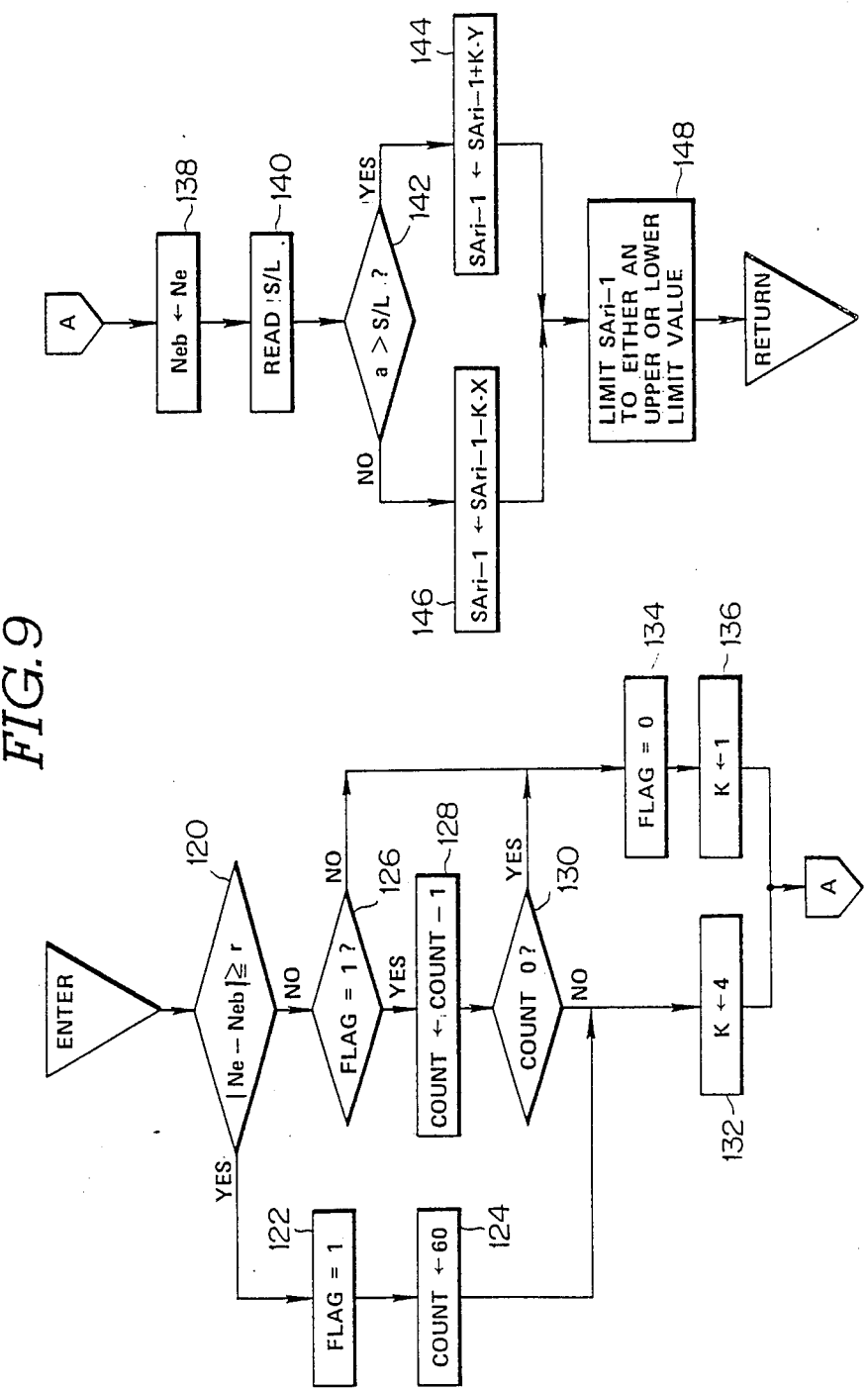
FIG. 9 is a detailed operation flowchart representing an execution program by which the knocking control is processed.

In the subroutine shown in FIG. 9, an engine operating state in which the engine knocking is susceptible to occur is predicted on the basis of a change rate of the engine revolutional speed and lapse time after the engine revolutional speed has been changed, a correction coefficient K is set which futhermore corrects basic advance and retardation correction amounts X and Y, the occurrence of engine knocking is determined from a magnitude of the peak value a derived in the step 104 in FIG. 6, and a retardation angle correction amount $SA_{ri-1}$ on the previously ignited cylinder is corrected on the basis of the determination result of the engine knocking by correction amounts KX and KY which are multiplications of thee basic advance and retardation angle correction amounts X and Y by the correction coefficient K.

In a step 120, the MPU 62 compares an absolute difference value $|N_e - N_{eb}|$ using the current engine speed $N_e$ and the previous engine speed $N_{eb}$ derived in the step 72 of FIG. 3 with a predetermined value r (for example, a value between 25 r.p.m/IGN and 100 r.p.m/IGN). If $|N_e - N_{eb}| \geq r$ (yes) in the step 120, the routine goes to a step 122. If $|N_e - N_{eb}| < r$ (No) in the step 120, the routine goes to a step 126. Since the change rate of the engine speed is large when $|N_e - N_{eb}| \geq r$ and the engine high load state will occur, a flag FLAG is set to "1" in the step 122 and the count value C is set to a predetermined value (for example, 60) in a step 124. The flag FLAG indicates the engine operating state in which the occurrence of engine knocking will be predicted. The counter measures a lapse time after the engine speed is changed.

On the other hand, the MPU 62 determines whether the flag FLAG is set to "1" in the step 126. If FLAG=0 in dthe step 126, the routine goes to a step 134. If FLAG=1 in the step 126, the routine goes to a step 128. In the step 128, the count value C is decremented by one. In a step 130, the MPU 62 determines whether the count value C indicates zero. If C=0, the routine goes to a step 134. If C≠0, the routine goes to a step 132.

In a step 132, the MPU 62 determines that the engine operating state in which the enjgine knocking is susceptible to occur due to the large change of the engine speed. In this step 132, the MPU 52 sets the correction coefficient K by which the prede basic advance/retardation anglej is to multiplied to a large multiple (for example, four). On the other hand, in the step 134 and a step 136, the MPU 62 determines that the engine operating condition is normal. In the step 134, the flag FLAG is confirmed that it is "0" (if not, Flag←0) (indicates the engine operating state in which the occurrence of engine knocking is not susceptible to occur). In the step 136, the correction coefficient K is set to "1".

Next, in a step 138, the MPU 62 determines the current engine speed $N_e$ as the previous engine speed $N_{eb}$. In a step 140, the MPU 62 reads a slice level preallocated according to the engine operating state. In a step 142, the currently detected peak value a is compared with the slice level S/L, if a>S/L in the step 142, the routine goes to a step 144 since the inequality a>S/L indicates the occurrence of knocking. If a<S/L, the routine goes to a step 146. In the step 144, the retardation angle correction is carried out in accordance with the following equation (1). That is to say, a correction coefficient K.Y to which the retardation angle correction amount $SA_{ri-1}$ (i denotes the cylinder number in which the ignition is currently carried out and i−1 denotes the cylinder number in which the ignition was previously carried out) is added. The correction coefficient K.Y is a multiplication of a basic retardation angle Y (for example, 0.025°) by the above-described correction coefficient K.

$$SA_{Ri-1} \leftarrow SA_{ri-1} + K.Y \tag{1}$$

On the other hand, the advance angle correction is carried out in a step 146 in with the following equation (2). That is to say, a correction coefficient K.X is substracted from the advance angle correction amount $SA_{ri-1}$. The correction coefficient K.X is a multiplication of a basic advance angle X (for example, 0.25) by the above-described correction coefficient K.

$$SA_{Ri-1} \leftarrow SA_{ri-1} - K.X \tag{2}$$

In a step 148, the MPU 62 determines whether the newly calculated retardaation angle correction amount $SA_{ri-1}$ exceeds a predetermined upper limit (for example, 15°) or a predetermined lower limit (for example, 0°). In addition, the MPU 62 limits the retardation angle correction coefficient $SA_{ri-1}$ to the upper limit or lower limit. Then the subroutine shown in FIG. 9 is ended.

Figure 10:
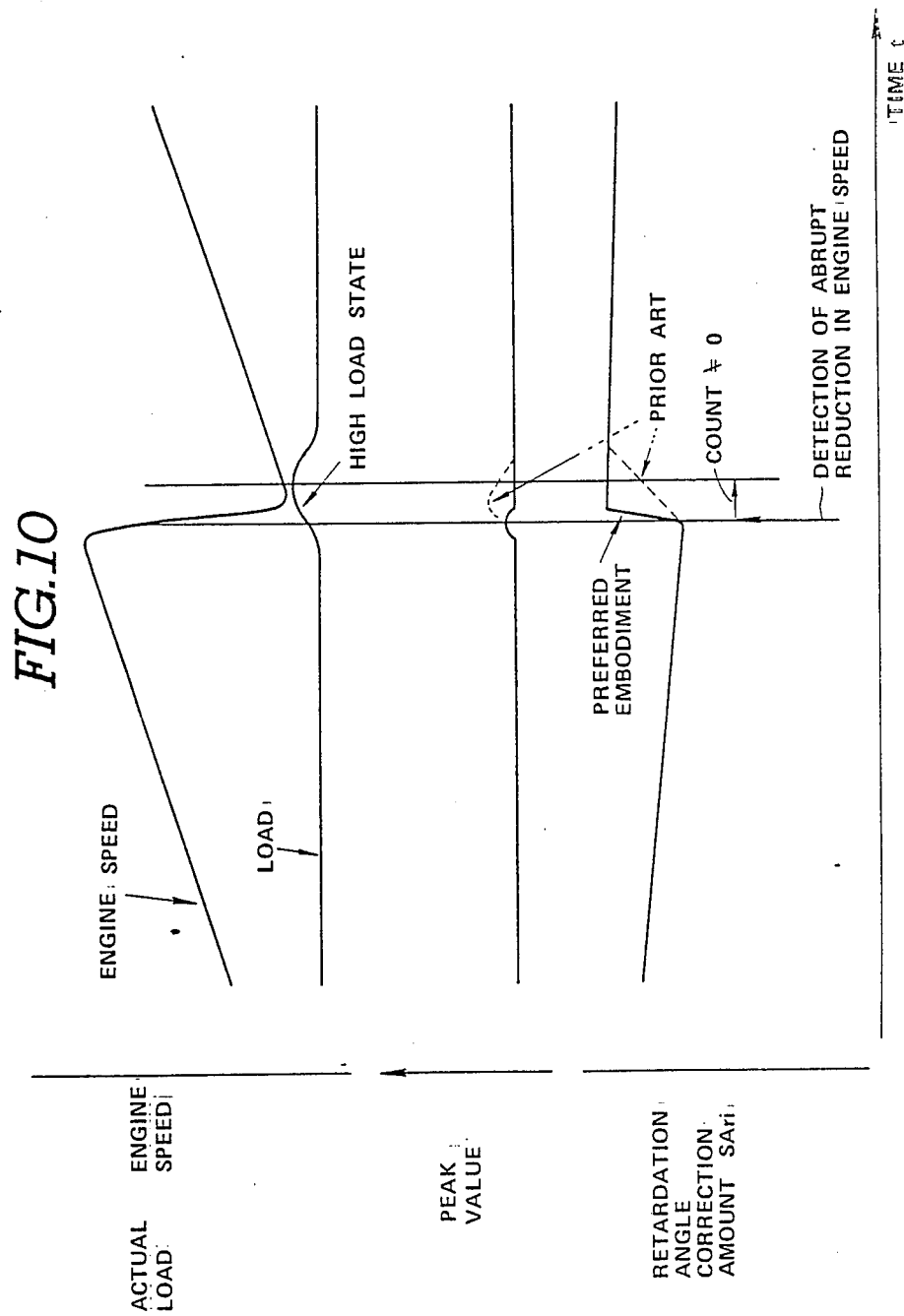
FIG. 10 is a characteristic graph for explaining the action of the ignition timing control system shown in FIGS. 1 through 9.

Next, FIG. 10 shows changes of the peak value a and retardation anagle correction amount $SA_{ri-1}$ with respect to lapse time when the engine speed $N_e$ and engine load are changed.

As shown in FIG. 10, when the engine load is constant and the engine revolution speed $N_e$ is gradually increased, the above-described correction coefficient K indicates 1 so that the corrections K.X and K.Y have small values. Therefore, the ignition timing SA is slowly retarded since the retardation correction amount $SA_{ri}$ is gradually reduced.

Next, when the change rate of the engine speed $N_e$ becomes large ($|N_e - N_{eb}| \geq r$), the engine operating state becomes the high load state and the occurrence of engine knocking is predicted (refer to FIG. 10). In this case, the correction coefficient K is set, e.g., to four and correction amount K.Y. becomes large. Hence, as shown in FIG. 10(c), the retardation angle correction amount $SA_{ri}$ becomes abruptly large and this ignition timing is quickly corrected.

Thereafter, when the absolute difference ($|N_e - N_{eb}|$) in the engine speed becomes smaller than the predetermined value, the flag FLAG is maintained at "1" (indicating that the occurance of engine knocking will occur) and the correction coefficient K.Y is set to four.

Hence, the correction coefficient K.Y becomes large so that the ignition timing is quickly corrected.

When the count value C indicates zero, the correction coefficient K is set, to "1". Since the correction coefficient K.Y becomes small, the ignition timing SA is slowly corrected.

In this way, when the engine speed abruptly changes, the engine operating state becomes the high load state. At this time, the occurance of engine knocking is predicted and the basic ignition timing value $SA_o$ is quickly corrected with the correction coefficients K.Y, K.X for the retardation angle correction amount $SA_{ri}$ set to larger values. Consequently, the occurance of engine knocking can effectively be suppressed.

It should be noted that a ratio between the basic advance angle correction amount X and basic retardation angle correction amount Y (X/Y) of the retardation angle correction amount $SA_{ri}$ is constant irrespective of the engine operating state. That is to say, this is because in order to supress the engine knocking to a predetermined level, a frequency at which the peak value a exceeds S/L is required to be held below the generation frequency at the knocking permissible level. Hence, if a>S/L and the correction of the ignition timing is carried out toward the retardation angle side, the ignition timing SA is returned to the original with the Y/X maintained constant. If the occurance of knocking indicating that a>S/L is detected in synchronized with the ignition timing, the ignition timing SA is converged.

Therefore, X/Y denotes a generation frequency of the peak value a which indicates a>S/L at the knocking permissible level. Consequently, the basic ignition timing $SA_o$ cannot be converted to the target knocking level even if the correction becomes fast regardless of the relationship of X/Y. As described hereinabove, since in the system and method for controlling ignition timing for the vehicular internal combustion engine according to the present invention, the correction speed of the ignition timing can be set faster with the value of the advance/retardation correction amount increased according to the change rate of the engine speed. Consequently the occurance of engine knocking due to the abrupt change in the engine speed and large air introduction to the engine caused by the inertia force can effectively be suppressed.

It will be clearly be understood by those skilled in the art that the foregoing description is made in terms of the preferred embodiment and various changes and modifications may be made without departing from the scope of the present invention which is to be defined by the appended claims.

What is claimed is:

1. a system for controlling ignition timing for a vehicular internal combustion engine, comprising:
   (a) first means for detecting an engine operating condition;
   (b) second means for calculating a change rate of an engine revolution speed on the basis of the engine operating condition detected by the first means;
   (c) third means for determining whether the engine operating condition is trnasferred to an engine load region such that an occurance of engine knocking can be predicted on the basis of the change rate of the engine revolution speed calculated by the second means;
   (d) fourth means for deriving a basic ignition timing angle on the basis of the engine operating condition detected by the first means;
   (e) fifth means for setting a first correction coefficient on the basis of which the basic ignition timing angle derived by the fourth means is corrected when the third means determines that the engine operating condition is transferred to the engine load region;
   (f) sixth means for detecting whether a knocking is generated in the engine;
   (g) seventh means for calculating an ignition timing angle correction amount for correcting the basic ignition timing angle drived by the fourth means on the basis of the first correction coefficient set by the fifth means when the sixth means detects the engine knocking so that the ignition timing is immediately corrected toward a retardation angle side;
   (h) eighth means for correcting the basic ignition timing angle derived by the fourth means according to the ignition timing angle correction amount calculated by the seventh means; and
   (i) ninth means for igniting air-fuel mixture supplied to each engine cylinder at an ignition timing angle corrected by the eighth means.

2. The system according to claim 1, wherein the fifth means sets a second correction coefficient on the basis of which the basic ignition timing angle derived by the fourth means is corrected when a predetermined interval has elasped after the third means determines that the engine operating condition is transferred to the engine load region, the second correction coefficient having a value smaller than the first correction coefficient.

3. The system according to claim 2, wherein said seventh means calculates the ignition timing angle correction amount on the basis of the second correction coefficient set by the fifth means when the sixth means detects the engine knocking so that the ignition timing is slowly corrected toward the retardation angle side.

4. The system according to claim 1, wherein the seventh means calculates the ignition timing angle amount on the basis of the first correction coefficient set by the fifth means when the sixth means detects that no knocking is generated in the engine so that the ignition timing is immediately advanced.

5. The system according to claim 4, which further comprises tenth means for determining whether the ignition timing correction amount calculated by the seventh means has reached either an upper limit value or a lower limit value and limiting the ignition timing correction amount to either the upper limit value or lower limit value.

6. A system for controlling ignition timing for a vehicular internal combustion engine, comprising:
   (a) first means for detecting an engine operating condition;
   (b) second means for detecting a knocking generated in the engine;
   (c) third means for calculating a change rate of an engine revolution speed on the basis of the engine operating condition detected by the first means;
   (d) fourth means for deriving a basic ignition timing angle on the basis of the engine operating condition detected by the first means;
   (e) fifth means for setting a predetermined basic advance/retardation angle correction angle (X, Y) by which a retardation angle correction amount ($SA_{ri}$) for correcting the basic ignition timing angle derived by the fourth means so as to suppress the occurrence of engine knocking is corrected and for setting a correction coefficient (K) by which the predetermined basic advance/retardation angle correction angle (X, Y) is corrected according to the change rate of the engine revolution speed;
   (f) sixth means for calculating a correction amount for the retardation angle correction amount on the basis of the predetermined basic advance/retardation angle correction angle and correction coefficient set by the fifth means;
   (g) seventh means for calculating a new retardation angle correction amount on the basis of the detection result of the engine knocking by the second means and the correction amount calculated by the sixth means;
   (h) eighth means for correcting the basic ignition timing angle derived by the first means according to the new retardation angle correction amount calculated by the seventh means and outputting an ignition signal at the corrected ignition timing; and
   (i) ninth means for igniting air-fuel mixture supplied to each engine cylinder in response to the ignition signal outputted from the eighth means.

7. The system according to claim 6, wherein the fifth means sets the correction coefficient having a different value depending on whether the change rate of the engine revolution speed calculated by the third means exceeds a predetermined rate.

8. The system according to claim 7, wherein the correction coefficient when the change rate of the engine revolution speed exceeds the predetermined rate is larger than that when the change rate of the engine revolution speed does not exceed the predetermined rate.

9. The system according to claim 6, wherein the seventh means calculates the new retardation angle correction amount in the following way: $SA_{ri-1} \leftarrow SA_{ri-1} - K \cdot X$ when the engine knocking does not occur, wherein symbol X denotes the predetermined basic advance correction angle.

10. The system according to claim 9, wherein the seventh means calculates the new retardation angle correction amount in the following way: $SA_{ri-1} \leftarrow SA_{ri-1} + K \cdot Y$ when the engine knocking occurs, wherein symbol Y denotes the predetermined basic retardation correction angle.

11. A method for controlling ignition timing for a vehicular internal combustion engine, comprising the steps of:
   (a) detecting an engine operating condition;
   (b) calculating a change rate of an engine revolution speed on the basis of the engine operating condition detected in the step (a);
   (c) determining whether the engine operating conditon is transferred to an engine load region such that the occurence of engine knocking can be predicted on the basis of the change rate of the engine revolution speed calculated in the step (b);
   (d) deriving a basic ignition timing angle on the basis of the engine operating conditon detected in the step (a);
   (e) setting a correction coefficient on the basis of which the basic ignition timing angle derived in the step (d) is corrected when determining that the engine operating condition is transferred to the engine load region;
   (f) detecting whether a knocking is generated in the engine;
   (g) calculating an ignition timing angle correction amount for correcting the basic ignition timing angle derived in the step (d) on the basis of the correction coefficient;
   (h) correcting the basic timing angle derived in the step (d) according to the ignition timing angle correction amount calculated in the step (g); and
   (i) igniting air-fuel mixture supplied to each engine cylinder at an ignition timing corrected in the step (h).

* * * * *